(No Model.)
M. RAUBOLD.
COMBINATION ICE SHAVER AND MILK SHAKER.
No. 565,794. Patented Aug. 11, 1896.
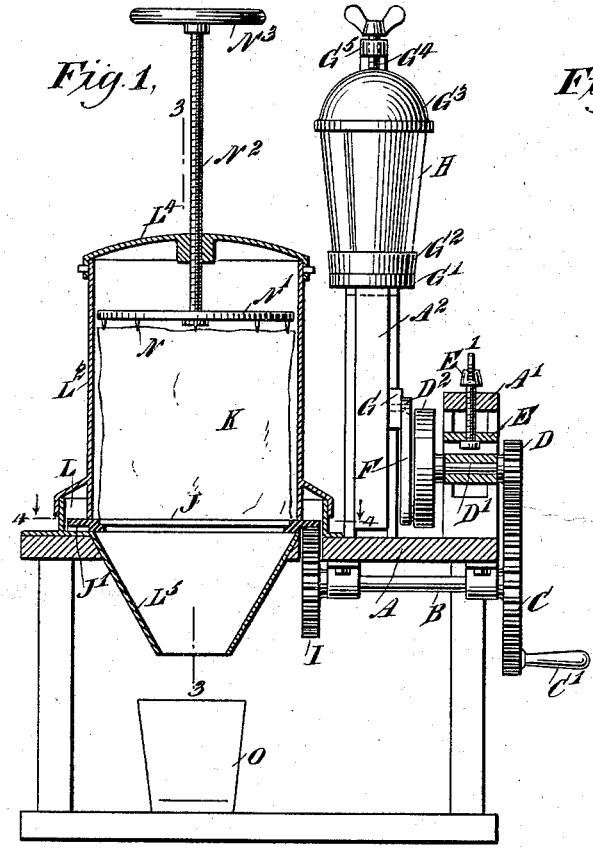
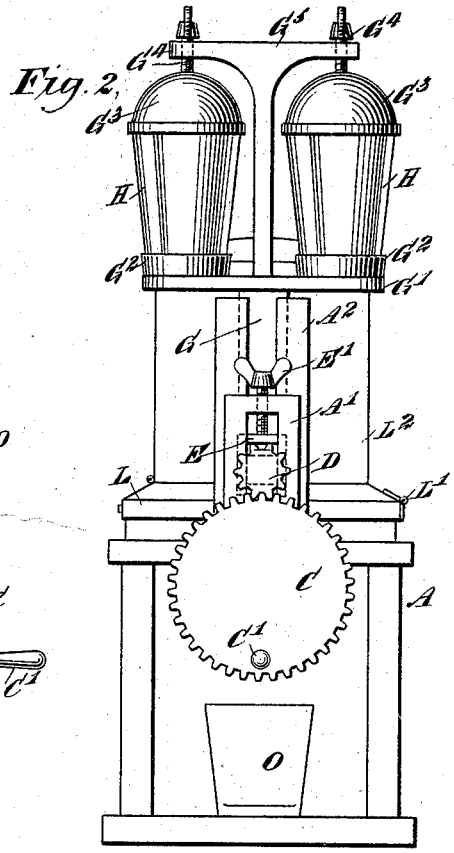
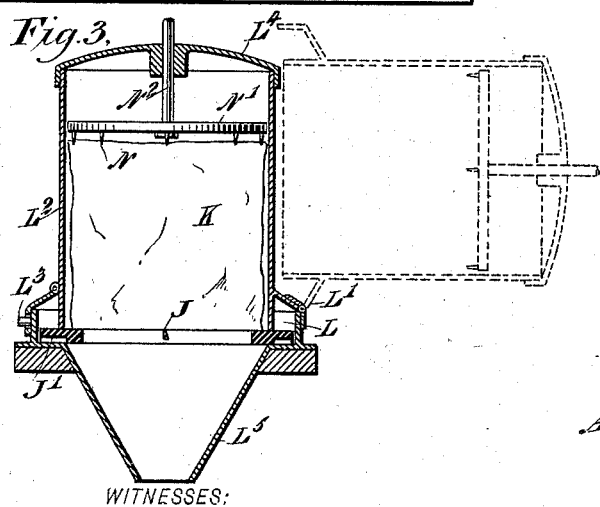
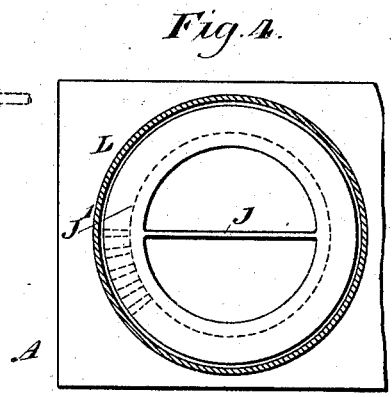
WITNESSES:
Edward Thorpe.
INVENTOR
M. Raubold.
BY Munn & Co.
ATTORNEYS.

UNITED STATES PATENT OFFICE.

MAX RAUBOLD, OF HOPKINSVILLE, KENTUCKY.

COMBINATION ICE-SHAVER AND MILK-SHAKER.

SPECIFICATION forming part of Letters Patent No. 565,794, dated August 11, 1896.

Application filed October 8, 1895. Serial No. 565,025. (No model.)

*To all whom it may concern:*

Be it known that I, MAX RAUBOLD, of Hopkinsville, in the county of Christian and State of Kentucky, have invented a new and Improved Combination Ice-Shaver and Milk-Shaker, of which the following is a full, clear, and exact description.

The object of the invention is to provide a new and improved combination ice-shaver and milk-shaker which is simple and durable in construction and arranged to enable the operator to simultaneously shake the milk and cut ice from a block in sufficient quantity for use in the next milk-shake.

The invention consists principally of a milk-shaker and ice-shaver and means for actuating said shaker and shaver simultaneously.

The invention also consists of certain parts and details and combinations of the same, as will be fully described hereinafter, and then pointed out in the claims.

Reference is to be had to the accompanying drawings, forming a part of this specification, in which similar characters of reference indicate corresponding parts in all the figures.

Figure 1 is a sectional side elevation of the improvement. Fig. 2 is a front elevation of the same. Fig. 3 is a cross-section of the same on the line 3 3 of Fig. 1, and Fig. 4 is a sectional plan view of part of the improvement on the line 4 4 of Fig. 1.

The combination ice-shaver and milk-shaker is mounted on a suitably-constructed frame A, on which is journaled a shaft B, carrying at its front end a gear-wheel C, provided with a handle C', adapted to be taken hold of by the operator to impart a rotary motion to the shaft B. A pinion D is adapted to mesh with the gear-wheel C and is secured on the outer end of a crank-shaft D', journaled in a bearing E, fitted to slide vertically in guideways A', erected on the frame A. A bolt E' engages the bearing E to permit of raising and lowering the latter and its shaft D' to move the pinion D in or out of mesh with the gear-wheel C.

On the inner end of the crank-shaft D' is secured a crank-disk D², connected by a pitman F with a cross-head G, fitted to reciprocate vertically in guideways A², erected on or forming part of the main frame A. On the upper end of the cross-head G is arranged a bar G', carrying saucers G², adapted to receive the glasses or other receptacles H, adapted to contain the milk, ice, liquid, or other substances generally used for making a milk-shake. The top of the receptacle H is engaged by a cover G³, held in place by a set-screw G⁴, screwing in a bracket G⁵, held on the bar G'. When the pinion D is in mesh with the gear-wheel C and the latter is rotated, then a rotary motion is transmitted to the shaft D', so that the crank-disk D² and pitman F impart a reciprocating motion to the cross-head G to move the receptacles H upward and downward to shake the contents therein.

On the inner end of the shaft B is secured a gear-wheel I in mesh with a gear-wheel J', having its spoke in the form of a knife J, engaging with its cutting edge the under side of a block of ice K, so that when the gear-wheel J' is rotated shavings of ice are cut off from the under side of the block of ice K. The gear-wheel J' is mounted to turn in the base L, connected by a hinge with a receptacle L², containing the block K, the base L being secured on the frame A and the receptacle L² being adapted to be swung in a horizontal position for placing the block of ice in position on the top of the knife J and gear-wheel J'.

Points N, secured to the under side of a disk N', are adapted to engage the top of the block of ice K, so as to hold the latter downward and prevent it from turning when the revolving knife J cuts the under side of said block. The disk N' is held on a screw-rod N², screwing in the cover L⁴ for the receptacle L², and on the upper end of said screw-rod is held a hand-wheel N³, adapted to be turned by the operator to screw the rod N² downward, so as to hold the points N in firm contact with the block of ice K. The receptacle L² is adapted to be locked in position on the base by a suitable catch L³. (Shown in Fig. 3.)

The shaved ice passes through the open gear-wheel J' into a hopper L⁵, formed on the base L, and the lower end of this hopper L⁵ discharges the shaved ice into a receptacle O to permit the operator to conveniently fill the ice shavings into the mixing-receptacles H of the shaker. Thus, when the shaft B is turned, as previously explained, the gear-wheel I rotates the gear-wheel J', so that the knife J cuts ice from the under side of the block K and the shavings are delivered by the hopper L⁵ into the receptacle O.

It will be seen that by the operator raising the bearing E he can disconnect the pinion D from the gear-wheel C and operate the ice-shaver without actuating the milk-shaker.

It will be seen that by having the receptacle L² hinged to the base the said receptacle can be swung downward to permit of conveniently removing the ice from the base and knife after the desired amount of ice has been shaved or cut off therefrom. By this arrangement the block of ice can be taken off and stored in the ice-house or ice-box until a further amount of shaved ice is required.

Having thus described my invention, I claim as new and desire to secure by Letters Patent—

1. The combination of a milk-shaker and ice-shaver, and means for actuating the same simultaneously, substantially as shown and described.

2. A device of the class described, comprising a revoluble shaft carrying two gear-wheels, a milk-shaker adapted to be geared with one of said gear-wheels, and an ice-shaver geared with the other gear-wheel, substantially as shown and described.

3. A device of the class described, comprising a revoluble shaft carrying a gear-wheel, a crank-shaft journaled in a vertically-adjustable bearing, a pinion held on said crank-shaft and adapted to engage the said gear-wheel, a reciprocating cross-head adapted to carry shaking vessels, and a pitman connecting said cross-head with the crank-disk on the crank-shaft, substantially as shown and described.

MAX RAUBOLD.

Witnesses:
GEORGE YOUNG,
FERD SCHMITT.